United States Patent
Lewis et al.

(10) Patent No.: US 7,877,618 B2
(45) Date of Patent: Jan. 25, 2011

(54) SYSTEMS AND METHODS FOR POWER MANAGEMENT

(75) Inventors: Jonathan F. Lewis, Pflugerville, TX (US); Andrew T. Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 784 days.

(21) Appl. No.: 11/897,190

(22) Filed: Aug. 29, 2007

(65) Prior Publication Data

US 2009/0063877 A1  Mar. 5, 2009

(51) Int. Cl.
*G06F 1/26* (2006.01)

(52) U.S. Cl. .......................... 713/310; 713/300

(58) Field of Classification Search .................. 713/301, 713/300, 310
See application file for complete search history.

(56) References Cited

U.S. PATENT DOCUMENTS

| | | | |
|---|---|---|---|
| 6,125,455 A * | 9/2000 | Yeo | 714/14 |
| 6,345,364 B1 * | 2/2002 | Lee | 713/324 |
| 6,677,740 B1 * | 1/2004 | Chen et al. | 323/303 |
| 7,024,569 B1 | 4/2006 | Wright et al. | |
| 7,203,044 B2 * | 4/2007 | Ando et al. | 361/79 |
| 2001/0033267 A1 * | 10/2001 | Kim et al. | 345/156 |
| 2002/0038394 A1 | 3/2002 | Liang et al. | |
| 2003/0107566 A1 * | 6/2003 | Shin et al. | 345/212 |
| 2003/0182476 A1 * | 9/2003 | Kuo et al. | 710/8 |
| 2004/0246341 A1 | 12/2004 | Lee et al. | |
| 2006/0035527 A1 | 2/2006 | Numano | |
| 2006/0226222 A1 | 10/2006 | Yu et al. | |
| 2008/0313477 A1 * | 12/2008 | Numano | 713/321 |

* cited by examiner

*Primary Examiner*—Nitin C Patel
(74) *Attorney, Agent, or Firm*—O'Keefe, Egan, Peterman & Enders LLP

(57) ABSTRACT

Systems and methods for providing smart power management to one or more external interfaces of an information handling system that is capable of acting as a host for charging and/or otherwise powering one or more external devices via external interface/s that have both data exchange and power transfer capability, such as USB or Firewire interfaces. A host-based power source may be provided that is capable of managing power when a host information handling system is in inactive, and a user-based methodology may be implemented to selectively provide power to one or more external interfaces of a host information handling system based on user need or desire for access to external interface power, even when the host information handling system is inactive.

33 Claims, 3 Drawing Sheets

SYSTEMS AND METHODS FOR POWER MANAGEMENT

FIELD OF THE INVENTION

This invention relates generally to power management and, more particularly, to managing power supplied to external interfaces of an information handling system.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as desktop or notebook computers, are commonly provided with external interfaces for exchanging data and/or power with various types of external or peripheral devices such as portable music devices (MP3 players), personal data assistants (PDAs), cellular phones, etc. For example, an information handling system may be provided with a dedicated external charge or energy port for redirecting power from the power source of an information handling system to a second device that is coupled to the information handling system via the port. Other examples of external interfaces include Universal Serial Bus (USB) and IEEE 1394 ("Firewire") based serial bus interfaces. Such serial bus interfaces have power transmission pins that allow external or peripheral devices to be powered and/or charged from an external port of a desktop or notebook computer, but also have other pins to provide data transmission capabilities via the same port. Design standards for the USB serial bus interface have been implemented, for example, by Windows Hardware Quality Labs (WHQL) and USB Special Interest Group (e.g., USB2.0).

In some desktop computer system configurations, power to a USB or Firewire serial bus interface of the system is made always available to the power transmission pins of the port, regardless of system state and without any system awareness the serial bus power state. In some desktop and notebook computer systems, power to a USB or Firewire serial bus interface of the system is only made available to the power transmission pins of the port when the system is powered on, again without any system awareness of the power state. Furthermore, an external or peripheral device may completely drain the battery of a notebook computer system through the power transmission pins of a USB or Firewire serial bus interface when the notebook computer is operating on battery power and is not externally powered.

SUMMARY OF THE INVENTION

Disclosed herein are systems and methods for providing power management to one or more external interfaces of an information handling system that is capable of acting as a host for charging and/or otherwise powering one or more external devices (e.g., consumer electronic devices) via its external interface/s that have both data exchange and power transfer capability, e.g., serial bus interfaces having both data exchange conductors (e.g., data transmission pins) and separate dedicated power transfer conductors (e.g., power transmission pins) such as USB-based interfaces (e.g., USB 2.0) or Firewire. In one exemplary embodiment power control may be provided to manage power transfer from the standard power transmission pins of a serial bus external interface port of a host information handling system (e.g., such as a host notebook computer, host desktop computer, host server, etc.) in order to redirect power from the host information handling system for other purposes. In another exemplary embodiment, a host-based power source (power management component) may be provided that is capable of managing power in a manner that is independent of the host information handling system operation and host management states (e.g., server management states, notebook management states) when enabled, e.g., to provide power management when the host information handling system is in an inactive state. In yet another embodiment, a user-based methodology may be implemented to selectively provide power to one or more external interfaces of a host information handling system based on user need or desire for access to external interface power, even when the host information handling system is inactive. Thus, a user may be enabled with the capability of taking advantage of the increasing internal battery capacity of battery-powered information handling systems, and may be enabled with the capability of enhancing power savings by decreasing power drawn by an information handling system whether or not operating on battery power.

In one embodiment, a host information handling system may be provided with built-in power management capability for monitoring and/or controlling supply of power to one or more external interface ports (e.g., serial bus interface ports) of the host system. Such a host information handling system may be, for example, a battery-powered information handling system such as a notebook computer, or may be another type of information handling system such as a desktop computer, a server, etc. This power management capability may be implemented by the host information handling system using any suitable combination of hardware, firmware and/or software components. However, in one exemplary embodiment, external interface power management may be advantageously implemented in a manner that is independent of the main operating system (OS) that is executing on the main central processing unit (CPU) of the host system. In this way, power management for the external interface port/s may be accomplished even when the main operating system is not running, e.g., when the CPU is inactive or shut-down. This operating system-independent capability may be accomplished, for example, by implementing one or more external interface power management features in the basic input/output system (BIOS) programming or other non-operating system programming of the host information handling system, e.g., that is executed on an embedded controller (EC) or other built-in controller or control device of the host system that is separate from the CPU of the system.

In one exemplary embodiment, an external interface power management scheme may be implemented so that full power is available to all external ports (e.g., serial bus ports) of a host information handling system per appropriate interface specification (e.g., appropriate USB or Firewire specification) when the host system is powered and the system is turned on and actively functioning. However, when the information handling system is turned off or otherwise inactive (e.g., in suspend or hibernation mode), one or more power management settings may be employed to control the number of external interface ports that remain powered, and/or the amount of power that is available to each port/s. As will be further described, these power management settings may be implemented, for example, as BIOS settings or as other non-operating system programming settings.

In one exemplary embodiment, external interface power management may be implemented by providing a host battery-powered information handling system (e.g., notebook computer, etc.) with a built-in power monitoring and control capability that monitors the remaining battery capacity of the host system (e.g., by monitoring battery voltage, etc.), and controls the provision of power to the power transmission pins of one or more external interface ports (e.g., conventional serial bus interface ports such as USB or Firewire) of the host system based on the monitored battery capacity of the system. In such an embodiment, only a portion of the battery capacity of the host system battery may be allocated for use by an external device (e.g., via the standard power transmission pins of a conventional external interface port), saving the remainder of the battery capacity for operation of the host information handling system itself. Using this methodology, power may be removed from an external port to which an external device is coupled, leaving a pre-defined amount of battery power for usage by the host system while at the same time allowing the external device to charge while the host system is non-operational. Alternatively, battery capacity may be preserved by controlling the time that power is provided to the power transmission pins of one or more external interface ports of a battery-powered information handling system (e.g., by using a timer to limit the amount of time to a preselected amount of time that power is provided to the power transmission pins). In either case, power available to external devices may be limited in a way that prevents completely draining the battery of the host system.

External interface power management options may also be implemented in exemplary embodiment based on the identity of the power source currently employed to power a host battery-powered information handling system. For example, when the host system is provided with power from an external power source (e.g., an AC adapter or AC wall power), all external interface ports may be allowed to have full power per appropriate interface specification (e.g., per USB or Firewire specification), or the number of external interface ports that are allowed full power may be optionally limited based on voltage regulator constraints of the host system. When the host information handling system is turned on and actively functioning on its own battery power only, all of its external interface ports may be powered per appropriate interface specification (e.g., per USB specification), subject to battery capacity limitations that may be implemented by external interface power management of the BIOS programming or other non-operating system programming of the information handling system, e.g., as a power saving setting. However, when the host system is supplied only with battery power and turned off, or is otherwise inactive (e.g., in D3 cold state, Host_powered_off state), external interface power management of the host system may be configured to allow a preset and limited number of the total number of external interface ports (e.g., as specified for User access) to be powered subject to battery capacity limitations that may be implemented by external interface power management of the BIOS programming or other non-operating system programming of the host system.

In a further exemplary embodiment, an external interface power management scheme may be provided that allows a User of a corresponding host information handling system to select and specify power management options for the external interface ports. For example, using such an exemplary embodiment, a User looking for access to external interface port power for one or more external devices may be enabled to retask the host system for recharging of such external devices e.g., PDA, cell phone, etc.

In the practice of the disclosed systems and methods, power management for one or more external interfaces of a host information handling system may be implemented so that power is available at the interface/s at all times, e.g., when the host system is both active and inactive. However, in an alternative embodiment, power management for a given external interface may only be initiated when user interest in powering an external device from the given external interface is detected, and this power management for the given external interface/s may be maintained for only so long as this user interest is maintained. In this way, power may be further conserved by only making power available to the given external interface (and only managing power for the given external interface) when user interest for such is actually detected.

User interest in powering an external device from a given external interface of a host system may be detected in any suitable manner, e.g., by sensing the presence of an external device at the given external interface, or by sensing the proximity of an external device near the given external interface. In this regard, one or more switches and/or sensors (e.g., physical switch/sensor, proximity switch/sensor, port stimulus switch/sensor, combination thereof, etc.) and/or any other suitable methodology and/or hardware may be utilized to determine the presence or proximity of an external device to a given external interface. Once user interest in powering an external device is detected, power management mode for the given external interface of the host system may be initiated (e.g., the external interface may be pre-armed) and power may be made available to the given external interface. This is followed by presence of the load itself when the external device is electrically coupled to the given external interface of the host system. In this exemplary embodiment, power may be made available to an external port, subject to the power management methodology described herein, for only so long as user interest is maintained (e.g., for only so long as the external device remains at or near the external interface). When implemented using BIOS programming executed by an embedded controller (EC) or other non-CPU processor of a host information handling system, the EC/BIOS review process may be similar to conventional run time, but may be directed to a specific offline power management mode (e.g., USB peripheral charging) when the host information handling system is in an inactive state.

In another embodiment, a host information handling system may be provided with optional power management indicator/s (e.g., one or more indicator lights) to allow a user to readily determine power management status for a given external interface (e.g., to determine by observation of the indicator/s if power is available or not available at the given external interface), as well as to optionally determine status of the host information handling system (e.g., to determine host battery power capacity available for charging external device/s from a host battery-powered information handling system) in a manner similar to charge capability status indicator currently found on battery units today. Such a power management indicator may be, for example, a light indicator provided on the host information handling system that lights a particular color to indicate that power is available at a given external interface/s of an inactive host information handling system, e.g., in response to a button manually pushed by user, and/or automatically in response to the presence of an external device or connector therefor at the given external interface/s sensed by system BIOS or other suitable offline logic. In other embodiments, one or more power management features of a host information handling system may be selectable by a user, e.g., may be selectively enabled and disabled by a user, may be adjusted by a user via BIOS settings, may be applied by a user to manage power supplied by one or more of multiple possible batteries of a host information handling system, may be selected by a user to allow AC-based DC power (e.g., DC power provided by an AC adapter) flowthrough, may be modified by a user to enable use with future improvements to USB and system topologies, etc.

In one respect, disclosed herein is an information handling system, including: a central processing unit (CPU), the CPU configured to execute an operating system (OS) of the information handling system; at least one external interface, the external interface being configured to be coupled to an external device and having separate power transmission and data transmission conductors, one or more of the data transmission conductors being coupled to exchange data with the CPU; at least one power regulation component configured to provide power to the external device through at least one separate power transmission conductor of the at least one external interface; and at least one power management component configured to manage supply of power to the at least one separate power transmission conductor of the at least one external interface by controlling operation of the at least one power regulation component, the at least one power management component being different from the CPU.

In another respect, disclosed herein is an information handling system, including: a central processing unit (CPU), the CPU configured to execute an operating system (OS) of the information handling system; at least one external interface, the external interface being configured to be coupled to an external device and having separate power transmission and data transmission conductors, one or more of the data transmission conductors being coupled to exchange data with the CPU; at least one power regulation component configured to provide power to the external device through at least one separate power transmission conductor of the at least one external interface; and at least one power management component configured to manage supply of power to the at least one separate power transmission conductor of the at least one external interface when the CPU is inactive by controlling operation of the at least one power regulation component based on at least one of an input received from a user, an input received from sensor that is indicative of the presence or proximity of an external device or connector therefor to the at least one external interface, or a combination thereof.

In another respect, disclosed herein is a method of managing power, including providing an information handling system that includes: a central processing unit (CPU) configured to execute an operating system (OS) of the information handling system; and at least one external interface that is configured to be coupled to an external device and that has separate power transmission and data transmission conductors with one or more of the data transmission conductors being coupled to exchange data with the CPU. The method may also include managing supply of power to the external device through the at least one external interface in a manner such that the managing supply of power is not performed by the CPU.

DESCRIPTION OF ILLUSTRATIVE
EMBODIMENTS

Figure 1:
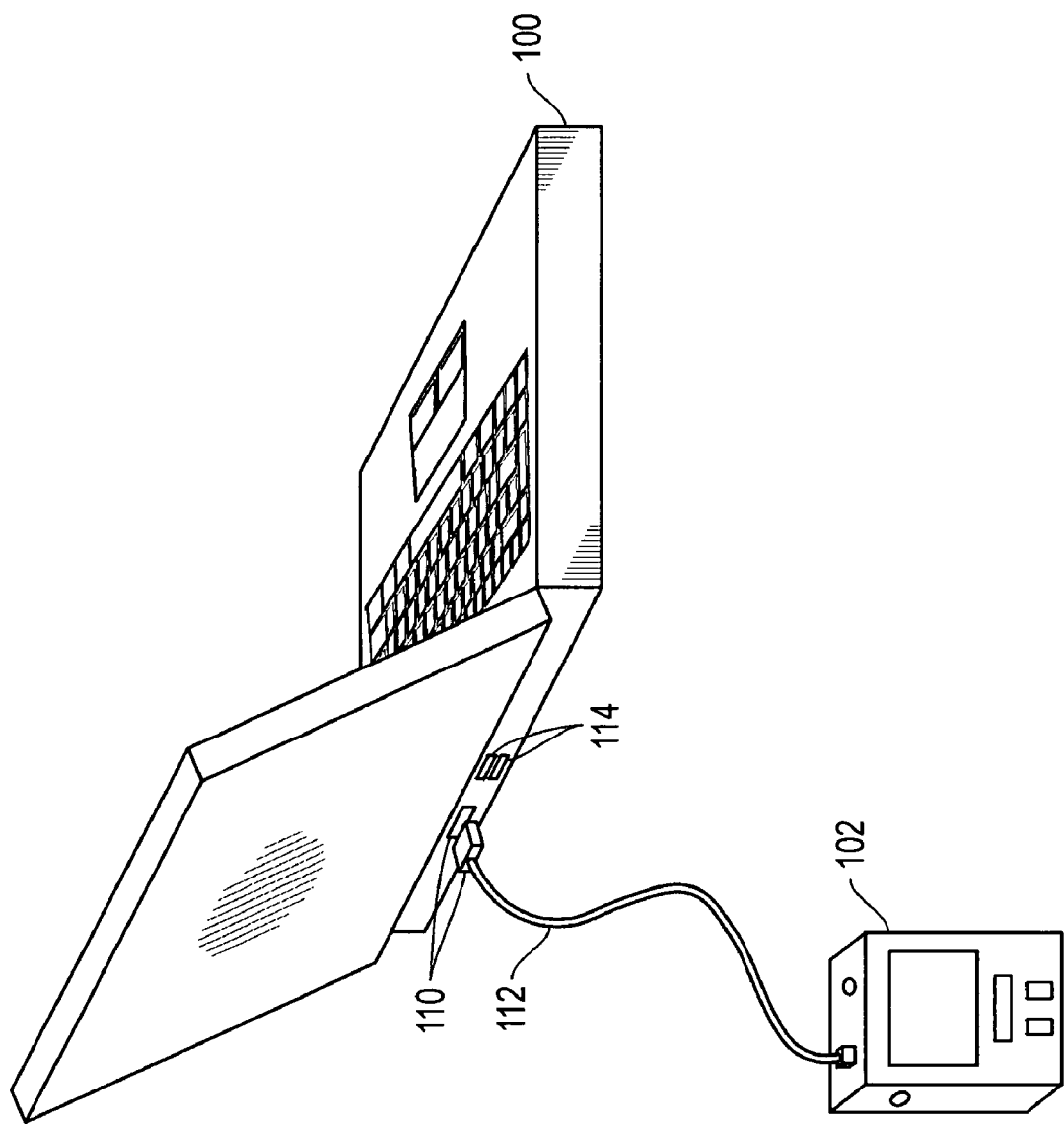
FIG. 1 shows a host information handling system and coupled external device according to one exemplary embodiment of the disclosed systems and methods.

FIG. 1 shows a host information handling system 100 that is configured in this exemplary embodiment as a notebook computer. As shown in FIG. 1, host information handling system 100 is configured with multiple external serial bus interface ports 110 and 114 that each includes data transmission pins and power transmission pins. In the illustrated embodiment, two USB 2.0 interface ports 110 and two Firewire interface ports 114 are shown provided, although any other number and/or types of such interface ports may be present in other embodiments. As further shown in FIG. 1, a battery-powered external device 102 in the form of a portable music player is shown coupled to one USB 2.0 interface port 110 via USB connector cable 112 for exchange of data with information handling system 100, and for transfer of power from information handling system to external device 102 for purposes of battery charging and/or powering circuitry within external device 102.

Although FIG. 1 illustrates a host portable information handling system configured in the form of a battery-powered notebook computer 100, it will be understood that the disclosed systems and methods may be implemented to manage power transfer from one or more external interfaces of any other type of portable, non-portable, battery or non-battery powered host information handling system configuration to one or more external device/s. It will also be understood that other types of external devices (e.g., PDAs, cell phones, fans, lights, etc.) may be similarly coupled to a host information handling system to receive power via other types of external interface ports (e.g., Firewire, etc.). In this regard, even thought FIG. 1 shows external device 102 configured with components that include memory/processor 226, battery 224, etc., an external device may be of any other configuration having a load suitable for drawing power from an external interface, e.g., including a "dumb" non-battery device such as personal fan or lamp. Furthermore, an external device may be directly coupled by connector to receive power from an external interface port (i.e., without the presence of an intervening cable), and/or one or more external interface ports may be located in any suitable position on an information handling system (e.g., other than the backside position illustrated in FIG. 1).

Figure 2:
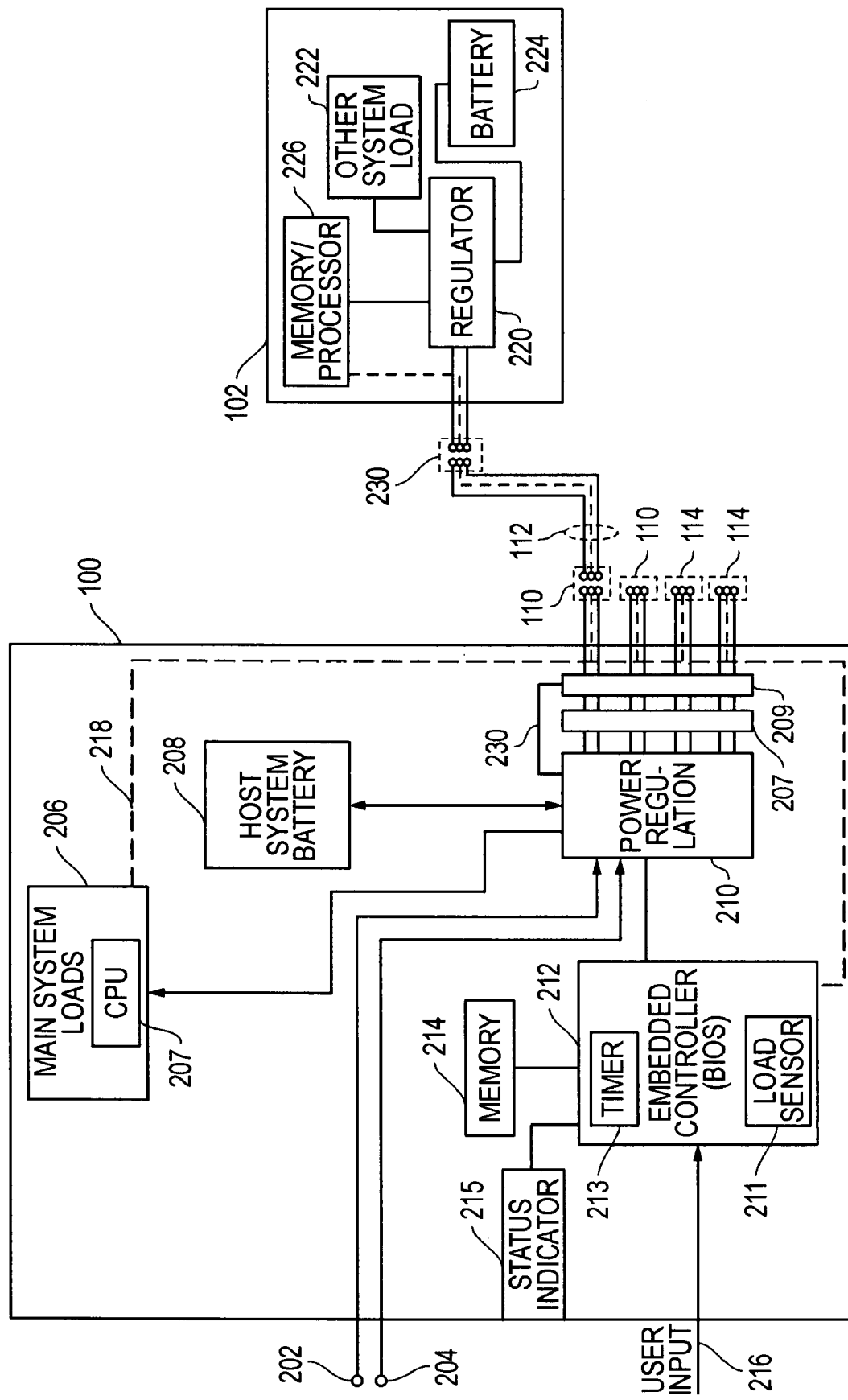
FIG. 2 is a simplified block diagram of a host information handling system and coupled external device according to one exemplary embodiment of the disclosed systems and methods.

FIG. 2 is a simplified block diagram showing battery-powered host information handling system 100 coupled to external device 102 by connector cable 112 (e.g., USB 2.0 cable) that is coupled between one of the external interface ports 110 (e.g., USB 2.0 port) of information handling system 100 and an external interface port 230 of external device 102. As shown in FIG. 2, host information handling system includes power regulation component/s 210 that is coupled to receive external power from external power terminals 202, 204 (e.g., from a coupled AC adapter or from an AC current source) and/or from host system battery 208 (e.g., replaceable or fixed battery pack), and to distribute power to each of host system CPU 207 and other system loads 206 (e.g., hard drives, disc drives, display, keyboard, speakers, etc.) and to each of external interface ports 110 and 114. It will be understood that FIG. 2 is a simplified representation and that one or more separate voltage regulation and/or AC to DC power conversion circuit components (e.g., 5 volt regulator/s) may be present that are suitable for performing one or more tasks of power regulation component/s 210. Shown coupled in the power path between power regulation component/s 210 and each of interface ports 110 and 114 are reverse leakage control and electrostatic discharge (ESD) component 207 (e.g., diode to discharge high current) and overcurrent control component 209 (e.g., polyfuse switch with optional status signal 230 to embedded controller 212) that may be optionally present. In this regard, reverse current leakage control may be provided to prevent power from flowing back into inactive electronic components (e.g., chipset) of host information handling system 100 when in inactive states. In the illustrated embodiment, CPU is configured to execute the operating system (OS) programming of information handling system 100.

In FIG. 2, power regulation component/s 210 is also shown coupled to provide power for charging to host system battery 208 (i.e., when supplied with external power via external power terminals 202, 204). Host information handling system 100 also includes a power management component in the form of embedded controller (e.g., keyboard controller) 212 that is configured to execute system BIOS or non-operating system programming, and to control operation of power regulation component/s 210. Embedded controller 212 is also coupled to memory 214 (e.g., Flash memory) where external programming and/or settings may be stored, and is optionally coupled to receive user input 216, e.g., from one or more provided power management buttons, switches or other suitable input/output (I/O) device/s that operate independently of operating system 207. Such user input 216 may, for example, allow a user to instruct embedded controller 212 to provide power to one or more selected external interface ports 110, 114 for powering an external device/s when host information handling system 100 is inactive.

It will be understood that FIG. 2 is exemplary only, and that any other type and/or configuration of one or more power management components may be employed that is separate from CPU 207 and that is suitable for providing power control in the manner described herein for embedded controller 212. Examples of such power management components include, but are not limited to, smart or programmable power management components such as microprocessor/s that are separate from embedded controller 212 (e.g., dedicated microprocessor), analog logic, etc. Other examples include non-programmable or non-intelligent power management components. It will also be understood that a power management component and a power regulation component may be integrated together or otherwise provided as part of a single component.

In one embodiment, a power management component may be a state machine (e.g., analog state-based control device). For example, a power management component may be provided in one exemplary embodiment in the form of a programmable or non-programmable timer that may be activated by a button on a host information handling system, and in which the timer is configured to provide power to one or more external interfaces for a given period of time upon manipulation or selection of the button by a user. In such a case, the power management component may be coupled to control a power regulation component that may, for example, be provided in the form of an on/off switch such as a transistor or mechanical switch. As such it will be understood that a power regulation component may be any component that is suitable for regulating power supplied to an external interface, and that one or more power regulation components may be employed to regulate power to a common external interface. In another alternative embodiment, a timer-based power management component may be activated upon lid closure of a host notebook computer (or upon occurrence of other inactivation event of a host information handling system such as pressing of "standby" button of the host) so that power is provided to one or more external interfaces of the host information handling system for a given period of time (e.g., 2 hours or other selected time) following the inactivation event.

Still referring to FIG. 2, an optional interface power status indicator 215 (e.g., one or more LED or other type of visual indication lights) may be provided as shown and controlled by embedded controller 212 to indicate to a user the status of power supplied to interface ports 110 and 114 at any given time, e.g., to indicate which particular ports are supplied with power and which particular ports are not supplied with power, to indicate load condition on one or more external interface ports 110, 114, etc. In addition, embedded controller 212 may be programmed or otherwise provided with optional timer 213 which may be present to allow embedded controller 212 to measure elapsed time that power has been provided to one or more interface ports 110, 114, e.g., while information handling system is in a given power state. For example, timer 213 may be employed to enable embedded controller 212 to optionally limit the time for which power has been supplied to one or more ports 110, 114 by cutting off power to ports 110, 114 after a specific period of time has passed, e.g., to limit the amount of power drained from host system battery 208 when information handling system 100 is in inactive (e.g. D3, Host-_powered_off) power state.

FIG. 2 also shows embedded controller 212 provided with optional load sensor 211 that may be present to allow embedded controller 211 to detect the presence of an external interface power load on one of interface ports 110, 114, even when operating system 207 is not operating. Such a load-sensing capability may be employed to allow embedded controller 212 to selectively provide full power to interface ports 110, 114 only when a current load in the form of an external device is coupled to one or more of interface ports 110, 114. In this manner, power may be further conserved by only fully powering an interface port 110, 114 when an external device load is actually present on one or more external interface ports 110, 114.

In one embodiment external interface power management may be implemented in an autonomous or "free-wheeling" manner so that power is always provided to one or more external interfaces of a host information handling system when the host information handling system is inactive. In another exemplary embodiment, external interface power management may be implemented such that power is only provided to one or more external interfaces of a host information handling system for a given period of time (e.g., following an inactivation or user selection event) when the host information handling system is inactive. In yet another embodiment, external interface power management may be provided only upon detection of an external device near an external interface/s and/or upon sensing of a load at a given external interface/s. In a further embodiment, a user may be given the option (e.g., via BIOS settings) to selectively activate or disable one or more of the previous three options for a given information handling system.

For example, in one exemplary embodiment, a host information handling system 100 may be further provided with an optional sensor coupled to embedded controller 212 for detecting the presence of an external device at the given external interface, and/or for detecting the proximity of an external device (or a connector therefor) near the given external interface, even when operating system 207 is not operating. Examples of such presence and/or proximity sensors include, but are not limited to, physical switches, radio frequency or infrared proximity sensors, port stimulus sensors, magnetic sensor, etc. and combinations thereof. Such an optional presence/proximity sensor may be provided in one exemplary embodiment to sense when an external device (or connector therefor) is present at or in close proximity near to one or more of external interface ports 110, 114 (e.g., before it is actually electrically coupled to draw power from one of interface ports 110, 114), and to indicate this presence or proximity by providing a control signal to embedded controller 212. In one exemplary embodiment, interface ports 110, 114 may be placed in a default unpowered state (e.g., when host information handling system 100 is in an inactive state), and only "pre-armed" by embedded controller 212 to allow load sensing by load sensor 211 when an external device is detected in proximity near interface ports 110, 114. Then, upon detection of an external load presence at one of interface ports 110, 114 by load sensor 211, a given external interface port may be provided with full power as previously described. Alternatively, when host system 100 is not provided with a load sensor 211, unpowered external interface ports 110, 114 may be placed in powered condition by embedded controller 212 when an external device (or connector therefor) is detected in proximity to one or more of the external interface ports 110, 114. In any case, the disclosed systems and methods may be implemented to allow embedded controller to detect external device load, presence and/or proximity at a given external interface port 110, 114 even when operating system 207 is not operating, and even when only the power transmission pins of the given external interface port 110, 114 are coupled to an external device (i.e., even when the data transmission pins are not coupled to the external device).

As further shown in FIG. 2, voltage regulation component/s are coupled to supply power to respective power transmission pins of each of external interface ports 110 and 114. Further, CPU 207 and embedded controller 212 are coupled as shown to exchange data 218 with respective data transmission pins of each of external interface ports 110 and 114. Further, in this exemplary embodiment, external device 102 includes voltage regulation component/s 220 that are coupled as shown between power transmission pins of external interface port 230 and each of battery 224 and other system load 222 of external device 102. External device 102 also includes memory/processor components 226 that are coupled to data transmission pins of external interface port 230. In the illustrated configuration, external device 102 is thus configured to receive power from information handling system 100 (e.g., to charge battery 224 and/or to power other system load 222 and memory/processor components 226) across connector cable 112, and to transfer data with information handling system 100 across connector cable 112. It will be understood that the particular illustrated component configuration of external device 102 in FIG. 2 is exemplary only.

In the practice of the disclosed systems and methods, analog hardware and/or software/firmware-based state-based safety features (e.g., voltage, current and/or temperature regulation features) may be optionally incorporated to monitor and control system thermal and power parameters (e.g., such as overcurrent and overvoltage conditions) when a host information handling system is inactive but power is being provided to one or more external interfaces of the information handling system. Such safety features may be autonomous and free-running systems, e.g., such as a resettable autonomous power switch that shuts down power or restricts current to an external interface when an over-current condition (e.g., high load condition) is detected. A similar type of resettable autonomous temperature switch may be provided that shuts down power or restricts current to an external interface when an over-temperature condition is detected. Alternatively, software executing on an EC may be employed to perform such safety functions during periods that a host information handling system is inactive. In one embodiment, such state-based safety features may be implemented to conform to Underwriters Laboratories (UL) standards.

Figure 3:
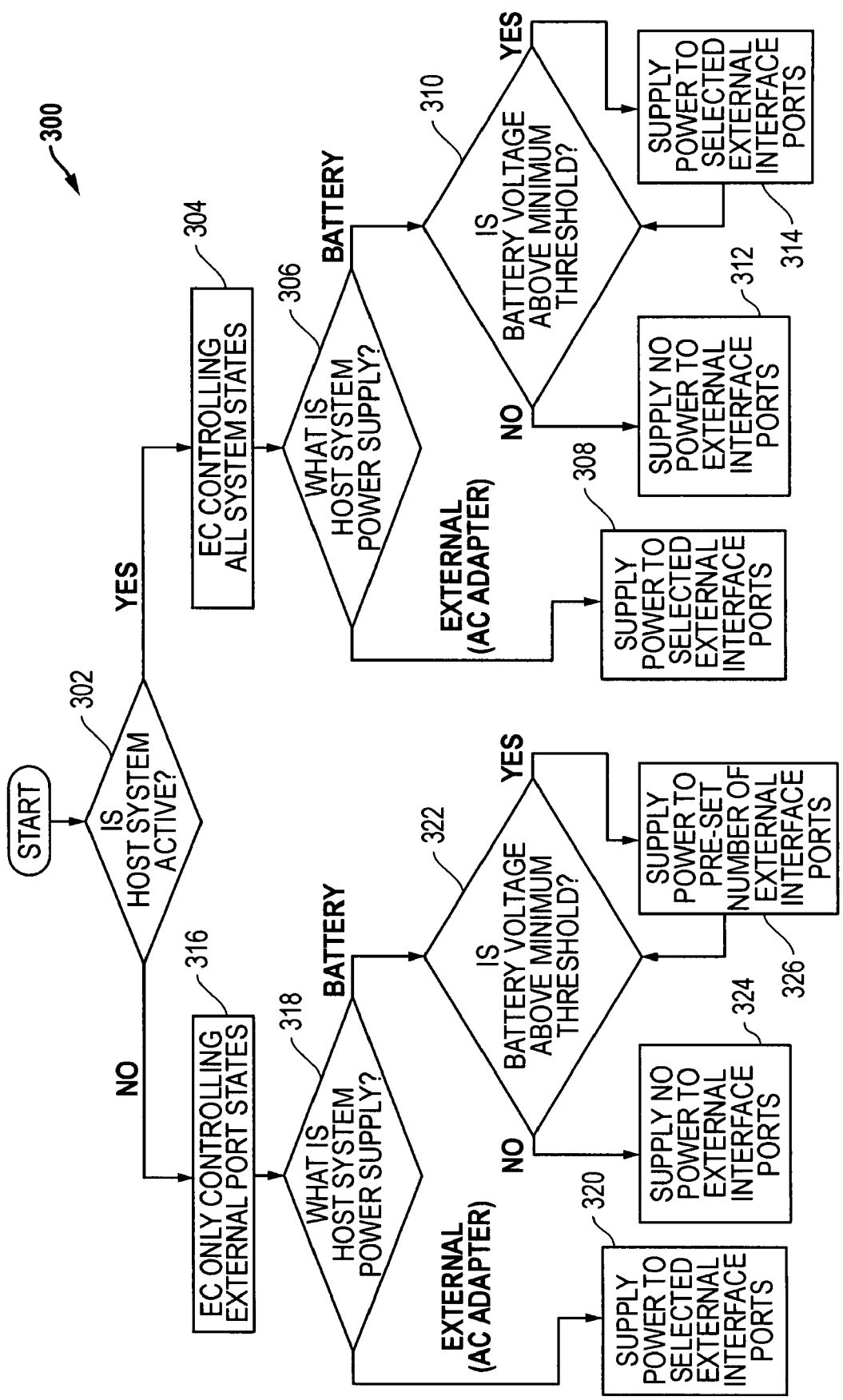
FIG. 3 illustrates smart power control methodology as it may be implemented according to one exemplary embodiment of the disclosed systems and methods.

FIG. 3 illustrates smart power control methodology 300 that may be employed in one exemplary embodiment by a host information handling system 100 of FIGS. 1 and 2 to manage supply of power to the power transmission pins of an external interface port that also has data transmission pins, including serial bus interfaces such as USB and Firewire interfaces. In the illustrated embodiment, methodology 300 may be implemented, for example, as BIOS programming running on embedded controller 212. However, in other embodiments smart power control methodology may be implemented by a host information handling system using any other non-operating system programming that is not executing on the CPU of the host information handling system.

As shown in FIG. 3, smart power control methodology 300 starts at step 302 and proceeds to step 304 if the host information system is active (i.e., host system CPU 207 is operating and the operating system is running thereon) where embedded controller 212 controls all system states of host system 100. If host system 100 is active and to be supplied with external power (e.g., AC adapter) in step 306 at terminals 202, 204, then power is supplied in step 308 to a selected number of (e.g., all interface ports or a selected portion of all interface ports) external interface ports 110 and 114 per specification (e.g., per USB or Firewire specification). However, if host system 100 is supplied with power in step 306 by host system battery 208, then it is next determined in step 310 if the voltage of host system battery 208 is above a selected minimum voltage threshold that corresponds, for example, to a minimum battery capacity that is desired to be maintained to allow for operation of host information system 100 for a selected period of time. If voltage of host system battery 208 is above the selected minimum voltage threshold, then power is supplied in step 314 to a selected number of (e.g., all interface ports or a selected portion of all interface ports) external interface ports 110, 114 per specification, and methodology then repeats step 310. If at anytime (initially or later) the voltage of host system battery 208 is found in step 310 to not be above the selected minimum voltage threshold, then methodology 300 proceeds to step 312 where no power is supplied to any external interface ports 110, 114, thus conserving battery power to allow for operation of host information system 100, e.g., for the selected period of time.

As shown in FIG. 3, methodology 300 proceeds to step 316 if the host information system is not active (i.e., host system CPU 207 is not operating and the operating system is not running) where embedded controller 212 controls only the state of external interface ports 110, 114. Examples of such conditions where host information handling system is not active include, but are not limited to, suspend, hibernation, stand-by or power-off states, etc. Examples include, but are not limited to, Microsoft suspend states such as S3 without wake on USB, S4, S5; or non-Microsoft suspend states for Linux operating system, etc. If host system 100 is inactive but supplied with external power (e.g., AC adapter) in step 318 at terminals 202, 204, then power is supplied in step 320 to selected external interface ports 110 and 114 per specification (e.g., per USB or Firewire specification). In this regard, one or more separate voltage regulation component/s having a limited voltage regulation capacity may be provided (i.e., separate from the main power regulation component/s 210 used to supply power to CPU 207 and other system loads) in one exemplary embodiment for supplying power to external interface ports 110, 114 when information handling system is not active.

In one exemplary embodiment, all external interface ports may be selected for powering in step 320. However, it will be understood that in an alternative embodiment, the number and identity of ports that are powered when host system 100 is inactive but supplied with external power may be selected and controlled by BIOS executing on embedded controller 212, e.g., as may be necessary or desirable to meet limited voltage regulation capability available when information handling system 212 is not active. For example, in one embodiment a bit may be enabled ("enable_bit") as part of the user/designer set and control block to indicate to an EC or other type of power management component whether or not one or more external interface ports are to be enabled when host system 100 is inactive. In this regard, the number of ports enabled for power may range from all ports enabled for power to a selected number of interface ports (e.g., all interface ports or a selected portion of all interface ports) enabled for power. Alternatively or additionally, one or more external ports may be selectively enabled with power for a limited period of time, e.g., using timer-based power management in a manner as previously described.

Still referring to FIG. 3, if host system 100 is supplied with power in step 318 by host system battery 208, then it is next determined in step 322 if the voltage of host system battery 208 is above a selected minimum voltage threshold that corresponds, for example, to a minimum battery capacity (e.g., 10% of total battery capacity) that is desired to be maintained to allow for operation of host information system 100 for a selected period of time. If voltage of host system battery 208 is above the selected minimum voltage threshold, then power is supplied in step 326 to a pre-set number of external interface ports 110, 114, and methodology then repeats step 322. If at anytime (initially or later) the voltage of host system battery 208 is found in step 322 to not be above the selected minimum voltage threshold, then methodology 300 proceeds to step 324 where no power is supplied to any external interface ports 110, 114, thus conserving battery power to allow for operation of host information system 100, e.g., for the selected period of time.

With regard to methodology 300 of FIG. 3, it will be understood that input from a user (e.g., user input 216 of FIG. 2) may also be optionally employed. For example, the pre-set powered ports of step 326 of FIG. 3 may be ports that have been previously selected by a user. In an alternative embodiment, identity of powered external interface ports 110, 114 may be dynamically selected and/or changed by a user during operation of steps 322 and 326 rather than being pre-set. In yet another alternative embodiment of step 326, identity of powered external interface ports 110, 114 may be dynamically selected and/or changed based on the detection of the presence of an external device at given external interface, and/or based on the detection of the proximity of an external device (or a connector therefor) near the given external interface in a manner as previously described in relation to FIG. 2.

It will be understood that methodology 300 of FIG. 3 is exemplary only, and that any combination of additional or fewer steps may be employed, and/or that the illustrated steps may be performed in any other order, that is suitable for implementing one or more of the smart power control features of the systems and methods disclosed herein. Furthermore, as previously described, power control methodology may be implemented in any suitable manner including, but not limited to, analog state-based hardware such as button and timer hardware, etc. It will also be understood that the exemplary system configurations of battery-powered host information handling system and coupled external device illustrated and described in relation to FIG. 2 are exemplary only, and that the disclosed smart power control methodology may be implemented using any other host information system and/or external device configuration that is suitable for implementing one or more of the smart power control features disclosed herein.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   a central processing unit (CPU), said CPU configured to execute an operating system (OS) of said information handling system;
   at least one external interface, said external interface being configured to be coupled to an external device and having separate power transmission and data transmission conductors, one or more of said data transmission conductors being coupled to exchange data with said CPU;
   at least one power regulation component configured to provide power to said external device through at least one separate power transmission conductor of said at least one external interface; and at least one power management component configured to manage supply of power to said at least one separate power transmission conductor of said at least one external interface in a manner that is separate and independent from said CPU and said OS by controlling operation of said at least one power regulation component, said at least one power management component being different from said CPU.

2. The information handling system of claim 1, wherein said at least one power management component is configured to manage supply of power to said at least one separate power transmission conductor of said at least one external interface by controlling operation of said at least one power regulation component and by selecting and controlling the number and identity of external interfaces that are powered in a manner such that said selecting and controlling are performed to both selectively provide and discontinue power to said at least one separate power transmission conductor of said at least one external interface while said CPU and OS are inactive.

3. The information handling system of claim 1, wherein said at least one power management component comprises an embedded controller of said information handling system, said embedded controller being configured to execute system BIOS programming of said information handling system.

4. The information handling system of claim 1, wherein said information handling system is a battery-powered information handling system, and comprises one or more battery cells coupled to provide power to said at least one power regulation component.

5. The information handling system of claim 4, wherein said information handling system comprises a first number of a plurality of said external interfaces; wherein said information handling system is configured to operate from power provided by said one or more battery cells and to alternately operate on power provided by an external power source; wherein said at least one power management component is configured to control operation of said at least one power regulation component to provide power to said first number of said external interfaces when said information handling system is operating on power from said external power source; and wherein said at least one power management component is configured to select a second number of said external interfaces that is less in number then said first number of said external interfaces and to control operation of said at least one power regulation component to provide power to said selected second number of said external interfaces when said information handling system is operating on power from said one or more battery cells while at the same time not providing power to the remainder of said first external interfaces, said second number of external interfaces being a selected portion of said first number of said external interfaces.

6. The information handling system of claim 4, wherein said at least one power management component is configured to monitor voltage of said one or more battery cells when said information handling system is operating on power from said one or more battery cells; wherein said at least one power management component is further configured to control operation of said at least one power regulation component to provide power to said at least one external interface when said information handling system is operating on power from said one or more battery cells and when a voltage of said one or more battery cells is greater than a voltage threshold; and wherein said at least one power management component is further configured to control operation of said at least one power regulation component to provide no power to said at least one external interface when said information handling system is operating on power from said one or more battery cells and when a voltage of said one or more battery cells is not greater than said voltage threshold.

7. The information handling system of claim 6, wherein said at least one power management component is further configured to:

(a) continue to monitor voltage of said one or more battery cells while said information handling system is operating on power from said one or more battery cells;

(b) initially determine that said voltage of said one or more battery cells is greater than said voltage threshold and based thereupon initially providing power to said at least one external interface while said information handling system is still operating on power from said one or more battery cells for as long as said a voltage of said one or more battery cells is greater than said voltage threshold; and (c) then determine that said voltage of said one or more battery cells is no longer greater than said voltage threshold and based thereupon then providing no power to said at least one external interface while said information handling system is still operating on power from said one or more battery cells.

8. The information handling system of claim 7, wherein said at least one power management component is further configured to perform all of said steps (a), (b) and (c) while said CPU and OS are inactive.

9. The information handling system of claim 1, wherein said information handling system comprises a first number of a plurality of said external interfaces; wherein said at least one power management component is configured to receive a user input selecting a second number of said external interfaces that represents a portion of said first number of said external interfaces and that includes said at least one external interface; and wherein said at least one power management component is configured to control operation of said at least one power regulation component to provide power to said selected second number of said external interfaces based on said user input while at the same time not providing power to the remainder of said first external interfaces.

10. The information handling system of claim 1, further comprising at least one sensor coupled to said at least one power management component, said sensor being configured to detect the proximity of an external device or connector therefor near said at least one external interface while said at least one external interface is in a default unpowered state and before said external device or connector is electrically coupled to said at least one external interface; and wherein said at least one power management component is configured to control operation of said at least one power regulation component to pre-arm said at least one external interface or provide power to said at least one external interface based on said detection by said sensor of the presence or proximity of an external device or connector therefor before said external device or connector is actually electrically coupled to said at least one external interface.

11. The information handling system of claim 10, wherein when said CPU and OS are not operating, said at least one power management component is configured to control operation of said at least one power regulation component to pre-arm said at least one external interface or provide power to said at least one external interface based on said detection by said sensor of the presence or proximity of an external device or connector therefor before said external device or connector is actually electrically coupled to said at least one external interface.

12. The information handling system of claim 1, wherein said at least one external interface comprises a universal serial bus (USB)-based external interface.

13. The information handling system of claim 1, wherein said power management component is configured with a timer to manage supply of power to said at least one separate power transmission conductor of said at least one external interface so as to provide power to said at least one separate power transmission conductor of said at least one external interface only for a given predetermined period of time following inactivation of the CPU and OS.

14. The information handling system of claim 1, wherein said at least one power regulation component is not used to supply power to said CPU and other system loads.

15. The information handling system of claim 1, wherein said system BIOS programming is configured to allow a user to use BIOS settings to selectively activate or disable external interface power management options of said at least one power management component.

16. The information handling system of claim 1, wherein said information handling system comprises a plurality of said external interfaces; wherein when said CPU and OS are not operating, said at least one power management component is configured to dynamically select and change the identity of a selected number of external interface ports to which power is provided at any given time by said at least one power regulation component.

17. An information handling system, comprising:
a central processing unit (CPU), said CPU configured to execute an operating system (OS) of said information handling system;
at least one external interface, said external interface being configured to be coupled to an external device and having separate power transmission and data transmission conductors, one or more of said data transmission conductors being coupled to exchange data with said CPU;
at least one power regulation component configured to provide power to said external device through at least one separate power transmission conductor of said at least one external interface; and
at least one power management component configured to independently manage supply of power to said at least one separate power transmission conductor of said at least one external interface without requiring or considering any information provided from said CPU or OS and when said CPU and OS are inactive by controlling operation of said at least one power regulation component based on at least one of an input received from a user, an input received from sensor that is indicative of the presence or proximity of an external device or connector therefor to said at least one external interface, or a combination thereof.

18. The information handling system of claim 17, wherein said at least one external interface comprises a universal serial bus (USB)-based external interface; and wherein said information handling system is a battery-powered information handling system, and comprises one or more battery cells coupled to provide power to said at least one power regulation component.

19. The information handling system of claim 17, wherein said at least one external interface comprises a universal serial bus (USB)-based external interface; and wherein said at least one power management component comprises an embedded controller of said information handling system, said embedded controller being configured to execute system BIOS programming of said information handling system.

20. The information handling system of claim 17, wherein said at least one external interface comprises a universal serial bus (USB)-based external interface; and wherein said at least one power management component is configured to receive a user input selecting said at least one external interface; and wherein said at least one power management component is configured to control operation of said at least one power regulation component to provide power to said selected at least one external interface based on said user input.

21. The information handling system of claim 17, wherein said at least one external interface comprises a universal serial bus (USB)-based external interface; and wherein said at least one power management component is configured to control operation of said at least one power regulation component to pre-arm or provide power to said at least one external interface based on a sensor input indicative of the presence or proximity of an external device or connector therefor.

22. A method of managing power, comprising:
providing an information handling system, said information handling system comprising:
a central processing unit (CPU) configured to execute an operating system (OS) of said information handling system, and
at least one external interface, said external interface being configured to be coupled to an external device and having separate power transmission and data transmission conductors, one or more of said data transmission conductors being coupled to exchange data with said CPU; and
managing supply of power to said external device through said at least one external interface;
wherein said step of managing supply of power is not performed by said CPU or said OS, and is performed separate and independent from said CPU and OS.

23. The method of claim 22, further comprising managing supply of power to said at least one separate power transmission conductor of said at least one external interface by controlling operation of said at least one power regulation component by selecting and controlling the number and identity of external interfaces that are powered in a manner such that said selecting and controlling are performed to both selectively provide and discontinue power to said at least one separate power transmission conductor of said at least one external interface while said CPU and OS are inactive.

24. The method of claim 22, wherein said information handling system is a battery-powered information handling system that comprises one or more battery cells coupled to provide power to said at least one power regulation component.

25. The method of claim 24, wherein said information handling system comprises a first number of a plurality of said external interfaces; wherein said information handling system is configured to operate from power provided by said one or more battery cells and to alternately operate on power provided by an external power source; and wherein said step of managing supply of power further comprises:
providing power to said first number of said external interfaces when said information handling system is operating on power from said external power source,
selecting a second number of said external interfaces that is less in number then said first number of said external interfaces; and
providing power to said selected second number of said external interfaces when said information handling system is operating on power from said one or more battery cells while at the same time not providing power to the remainder of said first external interfaces, said second number of external interfaces being a selected portion of said first number of said external interfaces.

26. The method of claim 24, further comprising:
monitoring voltage of said one or more battery cells when said information handling system is operating on power from said one or more battery cells;
providing power to said at least one external interface when said information handling system is operating on power from said one or more battery cells and when a voltage of said one or more battery cells is greater than a voltage threshold; and
providing no power to said at least one external interface when said information handling system is operating on power from said one or more battery cells and when a voltage of said one or more battery cells is not greater than said voltage threshold.

27. The method of claim 26, further comprising:
(a) continuing to monitor voltage of said one or more battery cells while said information handling system is operating on power from said one or more battery cells;
(b) initially determining that said voltage of said one or more battery cells is greater than said voltage threshold and based thereupon initially providing power to said at least one external interface while said information handling system is still operating on power from said one or more battery cells for as long as said a voltage of said one or more battery cells is greater than said voltage threshold; and
(c) then determining that said voltage of said one or more battery cells is no longer greater than said voltage threshold and based thereupon then providing no power to said at least one external interface while said information handling system is still operating on power from said one or more battery cells.

28. The method of claim 27, further comprising performing all of said steps (a), (b) and (c) while said CPU and OS are inactive.

29. The method of claim 22, wherein said information handling system comprises a first number of a plurality of said external interfaces; and wherein said method further comprises providing power to said at least one external interface based on a user input selecting a second number of said external interfaces that represents a portion of said first number of said external interfaces and that includes said at least one external interface while at the same time not providing power to the remainder of said first external interfaces.

30. The method of claim 22, further comprising:
(a) detecting the proximity of an external device or connector therefor near said at least one external interface while said at least one external interface is in a default unpowered state and before said external device or connector is electrically coupled to said at least one external interface; and
(b) pre-arming said at least one external interface or providing power to said at least one external interface only upon detection of the presence or proximity of an external device or connector therefor to said at least one external interface before said external device or connector is actually electrically coupled to said at least one external interface.

31. The method of claim 30, further comprising performing said steps (a) and (b) when said CPU and OS are not operating.

32. The method of claim 22, wherein said at least one external interface comprises a universal serial bus (USB)-based external interface.

33. The method of claim 22, wherein said information handling system comprises a plurality of said external interfaces; and wherein said method further comprises dynamically selecting and changing the identity of a selected number of external interface ports to which power is provided at any given time when said CPU and OS are not operating.

* * * * *